May 1, 1951 R. MacHENRY 2,550,836

SHEET CUTTING MEANS

Filed Sept. 4, 1948

INVENTOR.
RICHARD MacHENRY
BY
Thomas R. O'Nally

Patented May 1, 1951

2,550,836

UNITED STATES PATENT OFFICE 2,550,836

SHEET CUTTING MEANS

Richard MacHenry, Prospect Park, Pa., assignor to American Viscose Corporation, Wilmington, Del., a corporation of Delaware Application September 4, 1948, Serial No. 47,927

7 Claims. (Cl. 219—19)

This invention relates to the cutting or severing of sheet materials particularly those such as sheets comprising films or filaments of thermoplastic resins which may be divided by heated means.

For example, sheets or films comprising nylon, cellulose acetate and vinyl resins are often used for forming portions of wearing-apparel such as portions of hats, shoes, brassières, girdles, gloves, stockings, etc. The contours of such articles are of a complexity as to make mechanical means such as shearing or cutting tools impracticable, particularly when it is desired to cut as part of a molding procedure, and to remove the molded areas from the mold elements after cutting. Moreover, it is desirable to make use of the heat transfer characteristics of metallic molding equipment. If electrical means such as heated conductors are used along the surface of such molds, the problem of supporting the conductor and providing a continuous contact area between the conductor and the sheeted material becomes very troublesome on account of the different expansion characteristics of the conductor and the material from which the mold is constructed and/or the insulating material used to secure and support the conductor on the mold.

It is an object of the invention to provide means for separating molded areas from a sheet of heat reactive material during or immediately after the molding operation. Still another object of the invention is to provide a device whereby the severing operation may be accomplished almost instantaneously and simultaneously along all portions being separated. It is another object of the invention that the device provided must be easily installed and fitted about a complicated mold contour. It is a further object of the invention that the cutting or dividing means be simple in construction, adaptable to automatic operation, and not subject to rapid deterioration such as from fatigue resulting from repeated bending. Other objects, features and advantages of the invention become obvious from the following description and the drawing illustrating the invention in which:

The invention comprises an electrical conductor supported by portions embedded at spaced points along the surface of a mold or other support for sheeted materials. The conductor is formed and attached to the support for the sheet in such a manner as to render the conductor resistant to fatigue and to breaking loose from the material in which it is secured. Such conductors may be used also in molds of nonconducting material such as resin-impregnated fabric laminates or wood, although the invention is concerned chiefly with providing a conductor for use along the surfaces of metallic mold members. In the latter type of molding equipment, it is necessary to provide a groove in which may be distributed a nonconductive cement material or the like of sufficient quantity to provide adequate insulation and anchorage for the conductor.

Figure 1:
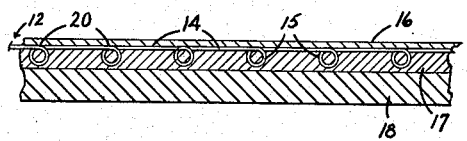
Fig. 1 illustrates by a fragmentary sectional view a conductor (not sectioned) mounted in a nonconductive material contained in a recess of a mold wall.

Fig. 1 illustrates a conductor such as a wire 12 of copper or of a material such as an alloy of nickel and chromium, looped at regular intervals with relatively straight portions 14 between the loops 15. The wire is secured to the mold by the embedment of the loops 15 in a nonconductive material 17 contained within a groove along the surfaces of a wall 18 of a mold or other support for the sheeted material 16. The loops are spaced within the material 17 at sufficient distances from sides and bottom of the grooves to allow the insertion of adequate insulation to withstand the current and voltage carried by the conductor 12. To a considerable extent, therefore, the depth and width of the groove and the amount of insulating material contained therein will depend on the strength of current and the voltage carried in the conductor. A 110-volt alternating current has been found very satisfactory for heating a nickel and chromium alloy wire conductor such as universally used as the heating element in heating appliances. The wires are squeezed together at points 20 where they cross so that the conductor presents a substantially continuous surface to a sheet of material 16 occupying the space immediately adjacent the straight portions 14.

Figure 6:
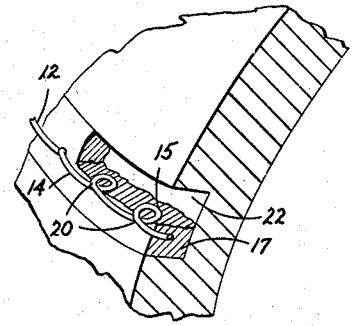
Fig. 6 is a pictorial view of a section taken from the mold member illustrated in Fig. 5 showing a nonconducting material cut away to expose normally embedded portions of the conductor.

Fig. 6 illustrates pictorially a section of a mold along which is provided a groove 22 containing the nonconducting cement material 17 partially cut away to expose the loops 15 of the conductor 12 embedded in the material. Portions 14 are not secured in the cement and are permitted freedom to flex or bend with changes in temperature. Each portion 14 undergoes extension or contraction between adjacent loops 15 as the result of the heating and cooling to which the conductor and other mold parts are subjected during a molding or forming operation. By such an arrangement linear changes of the conductor with respect to the supporting mold portions are distributed uniformly along the entire length of the conductor. Difficulties accruing from varying expansion coefficients of adjacent materials such as localized bending effects or separation of the bond between the different materials, are avoided. The loops themselves, under continued and repeated expansion and contraction of external portions of the conductor, may tend to loosen from the adjacent nonconducting material but on account of the loop construction of the conductor, wells or recesses are formed in the cement material around the loops which are relatively narrow at their entrance. The loops may work to a small extent within the wells but cannot escape on account of the cement material extending through the eyes of the loops, and the smallness of the loops and the narrowness of the wells in the portions nearest the surface of the surrounding insulating material. After considerable use, the conductor is still firmly supported on the surface of the mold even though the loops 15 have considerable working freedom within the wells.

Figure 2:
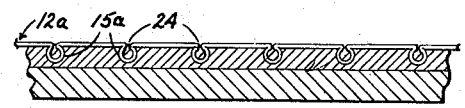
Figs. 2 and 3 illustrate by similar sectional views other modifications of the conductor illustrated in Fig. 1.

Fig. 2 illustrates a modification of the conductor of Fig. 1 wherein the loops 15a are formed differently but behave or function in a manner similar to that of loops 15 in Fig. 1. The necks 24 of the loops 15a should be quite narrow and the points of the conductor of either side thereof should nearly touch each other in order to give a substantially continuous cutting surface. However, a small gap in the necks 24 is desirable so that space is provided for expansion of the conductor portions between the loops. The conductor 12a may be formed readily and inexpensively on an automatic machine. This conductor has a further advantage of producing smoothly contoured cuts since it may be shaped so that the portions of the conductor between the loops are aligned in a straight line or a smoothly contoured curve.

Figure 4:
Fig. 4 is a sectional view of the modification illustrated in Fig. 3 taken along a plane normal to plane of section in Fig. 3.
Figure 3:
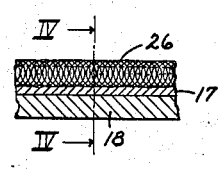

Figs. 3 and 4 illustrate a flat band 26 of small interwoven wires secured to the mold wall embedded in the cement material 17 so that the flat surface of the band is substantially normal to the outer surface of the mold. The band 26 should comprise wires of sufficient numbers and fineness to present a substantially continuous surface to the sheet material intended to be cut. A conductor constructed in this manner adjusts itself very readily to changes in expansion and contraction of a mold wall such as produced by the extreme changes in temperature incurred in heating a mold by steam under pressure and then chilling the mold by cold water.

Figure 5:
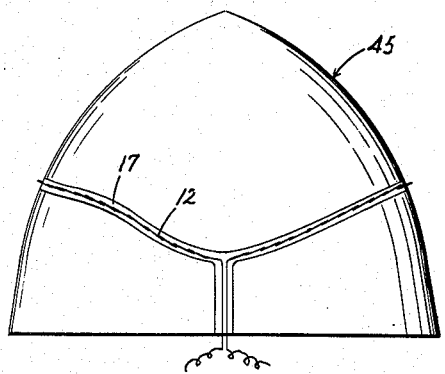
Fig. 5 is an elevation view showing a conductor such as illustrated in Fig. 1 attached to a molding member.

Fig. 5 illustrates a mold 45 of the type used for forming brassière elements. The mold is provided with a groove which follows a path along its surface conforming to the cut desired to shape the brassière element for attachment to body fitting straps or the like. The groove contains the cement material 17 into which loops of the conductor 12 are secured.

Electrical conductors of the type herein described avoid many of the defects of conductors heretofore constructed for cutting fusible sheet or other thin gauge fusible materials. For example, a conductor continuously embedded in a cemented groove of a mold tends to elongate to a greater extent than the mold wall or the surrounding cement. In the subsequent use of the mold, the cement is cracked and chipped out of the groove and the wire tends to buckle at places while under maximum elongation and may in time either break or ground on the metallic mold wall. According to the invention the service period of a conductor may be increased indefinitely if a conductor is secured to the mold only at spaced points and constructed resiliently so that it may elongate or contract independently of the material to which it is secured without causing strains which are destructive to the conductor and/or the insulating material or other mold portions.

Conductors of the type herein described are normally formed of fine wire, tubes, or bands of fine wire that are readily shaped to any path along the surface of the mold. Regardless of the shape of the mold, efficient and inexpensive means is thus provided for cutting a sheet material stretched or shrunk to conform to the surface of the mold. Such a cutting device has a further advantage being operated merely by an electrical switch which in turn may be operated from a cyclic controller of any of the conventional types used to control automatically controlled machinery.

While a preferred embodiment of the invention has been shown, it is to be understood that changes and variations may be made without departing from the spirit and scope of the invention as defined in the appended claims.

What is claimed is:

1. A mold for heat sensitive sheet materials comprising a metallic shaping element, a groove extending along the surface of the element conforming to a desired cutting path, a heat producing electrical conductor, all portions of which are spaced from the walls of the groove and comprising portions presenting a continuous surface to the material and other portions of the conductor supporting the material contacting portions, and a cement in the groove containing and surrounding the support portions of the conductor.

2. In apparatus for separating portions of a heat sensitive material, the combination of an electrically nonconducting material having an exposed surface, and an electrical conductor comprising sections extending in end-to-end arrangement adjacent to but not secured to the exposed surface of the nonconducting material, and deformable looped sections connecting adjacent ends of the first-named sections which absorb linear changes and extend into the nonconducting material to secure the conductor thereto.

3. Apparatus for separating portions of a heat sensitive sheet material comprising a support for the sheet material constituted of an electrically nonconducting material at least along the portions thereof corresponding to the separation line of the material, and an electrical conductor comprising sections extending in end-to-end arrangement adjacent to but not secured to the surface of the nonconducting material, and flexible looped sections which connect adjacent ends of the first-named sections and are substantially contained within the nonconductive material for securing the conductor to the support.

4. Apparatus for separating portions of a heat sensitive sheet material comprising a support for the sheet material constituted of an electrically nonconducting material at least along portions corresponding to the separation line of the material, and an electrical conductor comprising sections which present a substantially continuous surface to the sheet and extend in end-to-end arrangement adjacent to and free of the surface of the nonconducting material, and flexible looped sections for securing the conductor to the support which are substantially contained within the nonconductive material.

5. Apparatus for separating portions of a heat sensitive sheet material comprising a support for the sheet material, a groove in the surface of the support which corresponds to a predetermined separation line for the sheet, an electrically nonconductive cement material which substantially fills the groove, and an electrical conductor comprising sections extending in end-to-end arrangement independent of and adjacent to the surface of the cement material, and flexible looped sections for securing the conductor to the support which connect adjacent ends of the first-named sections and are substantially contained within the cement material.

6. Apparatus for separating portions of a thermoplastic sheet material comprising a support for the material, a groove in the surface of the support which corresponds to a predetermined separation path for the sheet, an electrically nonconductive material which fills the groove, and an electrical wire-like conductor comprising substantially straight sections extending in end-to-end arrangement adjacent to and free of the surface of the nonconductive material, and flexible looped sections which connect adjacent ends of the first-named sections and are substantially contained within wells of complementary contour in the nonconductive material, said wells having narrow neck portions near the entrances thereof which trap the looped sections within the nonconductive material and secure the conductor to the support.

7. Apparatus for separating portions of a thermoplastic sheet material comprising a support for the material, a groove in the surface of the support which corresponds to a predetermined separation line for the sheet, an electrically nonconductive material which fills the grooves, and an electrical conductor comprising a flat woven band of fine wires in which the wires extend substantially from edge to edge of the band in sinuous paths, said band being partially embedded in the nonconductive material with the flat surfaces thereof substantially normal to the adjacent surface of the nonconductive material and that of the support, with the individual wires of the bands passing into and out of the nonconductive material.

RICHARD MacHENRY.

REFERENCES CITED

The following references are of record in the file of this patent:

UNITED STATES PATENTS

| Number | Name | Date |
|---|---|---|
| 751,527 | Marr | Feb. 9, 1904 |
| 1,624,029 | Whitcomb | Apr. 12, 1927 |
| 1,954,061 | Smith | Apr. 10, 1934 |
| 1,992,250 | Stacey | Feb. 26, 1935 |
| 2,255,718 | Van Vorst | Sept. 9, 1941 |
| 2,430,920 | Dodge | Nov. 18, 1947 |